United States Patent [19]
Huang

[11] Patent Number: 5,282,296
[45] Date of Patent: Feb. 1, 1994

[54] STRAPPING MECHANISM

[76] Inventor: Han C. Huang, No. 12, Alley 111, Lane 437, Chen Hsing Rd., Taichung, Taiwan

[21] Appl. No.: 971,950

[22] Filed: Nov. 5, 1992

[51] Int. Cl.$^5$ ............................................. B25B 25/00
[52] U.S. Cl. ................................ 24/68 CD; 24/71.2
[58] Field of Search ............... 24/68 R, 68 CD, 71.2

[56] References Cited

U.S. PATENT DOCUMENTS 4,324,023  4/1982  Prete, Jr. ........................ 24/68 CD Primary Examiner—James R. Brittain
Attorney, Agent, or Firm—Woodcock Washburn Kurtz Mackiewicz & Norris

[57] ABSTRACT

A strapping device includes a base and a handle pivotally coupled together by two shafts, and a ratchet wheel engaged on the shafts and rotated in concert with the shafts. Each of the shafts includes a flange formed on one end and an aperture formed in the other end for receiving a pin; and each of the shafts includes a hollow interior and includes two edge portions extended inward of the hollow interior, whereby, the shafts have high strength and low manufacturing cost.

1 Claim, 3 Drawing Sheets

STRAPPING MECHANISM

BACKGROUND OF THE INVENTION

1. Field of the Invention

The present invention relates to a strapping mechanism, and more particularly to a strapping mechanism having a tough configuration.

2. Description of the Prior Art

A typical strapping mechanism is shown in FIG. 3 and includes a base 60 having a stop 61 resiliently disposed therein and having a pair of lugs 62 oppositely provided therein, a handle 70 having a pawl 71 resiliently disposed therein and having a pair of ears 72 oppositely provided therein and aligned with the lugs 62 of the base 60 respectively, a ratchet wheel 80 disposed between each of the lugs 62 and a respective ear 72 and engageable with the stop 61 and the pawl 71, each of the ratchet wheels 80 including a hole 82 formed in the center thereof, and a rib 84 formed in the hole 82 so as to separate the hole 82 into a pair of opposite semi-circular openings 86, and a pair of shafts 90 engaged through the openings 86 so as to form a rotating axle of the base 60 and the handle 70. Each of the shafts 90 has a semi-circular cross section corresponding to the shape of the openings 86 and includes a flange 91 formed on one end for engagement with one of said ears 72 of said handle 70 and a stub 92 formed on the other end for engagement in the orifices 94 of a disc 93 which is engaged with the other ear 72, such that the lugs 62 of the base 60 and the ears 72 of the handle 70 are rotatable about the shafts 90, and the ratchet wheel 80 rotates in concert with the shafts 90. The pawl 71 causes the ratchet wheels 80 and the shafts 90 to rotate in an active direction when the handle 70 is pulled away from the base 60, and the stop 61 prevents the ratchet wheels 80 from rotating in a reverse direction, such that the ratchet wheels 80 and the shafts 90 can be caused to rotate step by step. In operation, one end of a strap is inserted through the gap formed between the shafts 90 such that the strap can be tensioned when the ratchet wheels 80 and the shafts 90 are rotated.

However, the shafts 90 are made by molding processes and should be made of alloy materials such that the manufacturing cost thereof is greatly increased; in addition, the strength of the shafts 90 is weak such that the shafts 90 are usually broken.

The present invention has arisen to mitigate and/or obviate the afore-described disadvantages of the conventional strapping mechanisms.

SUMMARY OF THE INVENTION

The primary objective of the present invention is to provide a strapping mechanism which includes a pair of shafts having low manufacturing costs and having high strength.

In accordance with one aspect of the invention, there is provided a strapping mechanism comprising a base having a stop disposed therein and having a pair of lugs oppositely provided therein, a handle having a pawl disposed therein and having a pair of ears oppositely provided therein and aligned with the lugs of the base respectively, a ratchet wheel disposed between each of the lugs and a respective ear and engageable with the stop and the pawl, each of the ratchet wheels including a hole formed in a center thereof, a rib formed in the hole so as to separate the hole into a pair of opposite semi-circular openings, and a pair of shafts engaged through the openings so as to form a rotating axle of the base and the handle, the ratchet wheel rotating in concert with the shafts, each of the shafts including a flange formed on a first end thereof for engagement with one of the ears of the handle and an aperture formed in a second end thereof, a disc including two orifices formed therein for engagement with the second ends of the shafts, and a pin element engaged through the apertures of the shafts for retaining the disc in place, each of the shafts including a hollow interior and including two edge portions extended inward thereof, whereby, the shafts have high strength and low manufacturing cost.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
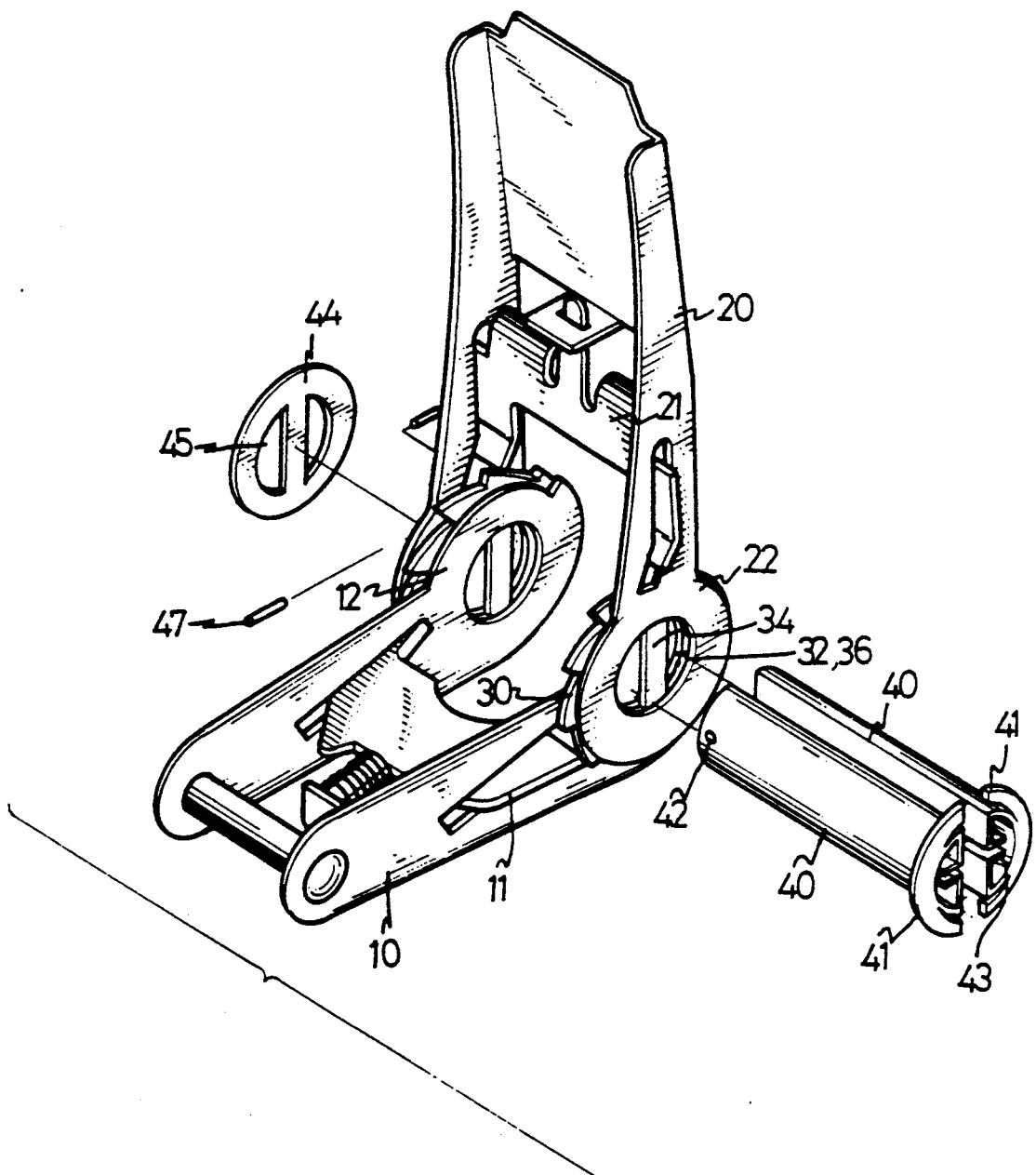
FIG. 1 is a partial exploded view of a strapping mechanism in accordance with the present invention.

Referring to the drawings, and initially to FIG. 1, a strapping mechanism in accordance with the present invention comprises a base 10 having a stop 11 resiliently disposed therein and having a pair of lugs 12 oppositely provided therein, a handle 20 having a pawl 21 resiliently disposed therein and having a pair of ears 22 oppositely provided therein and aligned with the lugs 12 of the base 10 respectively, a ratchet wheel 30 disposed between each of the lugs 12 and a respective ear 22 and engageable with the stop 11 and the pawl 21, each of the ratchet wheels 30 including a hole 32 formed in the center thereof, and a rib 34 formed in the hole 32 so as to separate the hole 32 into a pair of opposite semi-circular openings 36, and a pair of shafts 40 engaged through the openings 36 so as to form a rotating axle or pivotal axis of the base 10 and the handle 20. The ratchet wheel 30 rotates in concert with the shafts 40.

The pawl 21 causes the ratchet wheels 30 and the shafts 40 to rotate in an active direction when the handle 20 is pulled away from the base 10, and the stop 11 prevents the ratchet wheels 30 from rotating in a reverse direction, such that the ratchet wheels 30 and the shafts 40 can be caused to rotate step by step. In operation, one end of a strap is inserted through the gap formed between the shafts 40 such that the strap can be tensioned when the ratchet wheels 30 and the shafts 40 are rotated.

Each of the shafts 40 has a semi-circular cross section corresponding to the shape of the openings 36 and includes a flange 41 formed on one end for engagement with one of said ears 22 of said handle 20 and an aperture 42 formed in the other end, a disc 44 includes two semi-circular orifices 45 formed therein for receiving the other ends of the shafts 40, and a pin 47 engages through the apertures 42 of the shafts 40 so as to retain the disc 44 and the shafts 40 in place.

Figure 2:
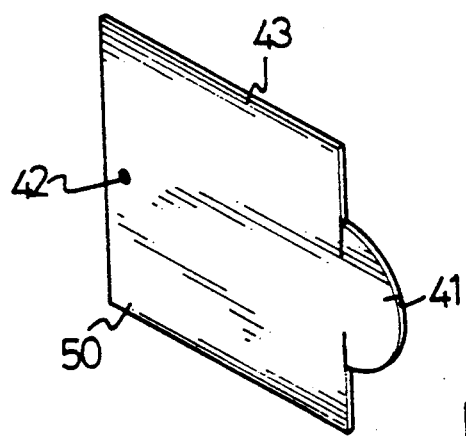
FIG. 2 is a perspective view of a plate for forming the shaft.
Figure 3:
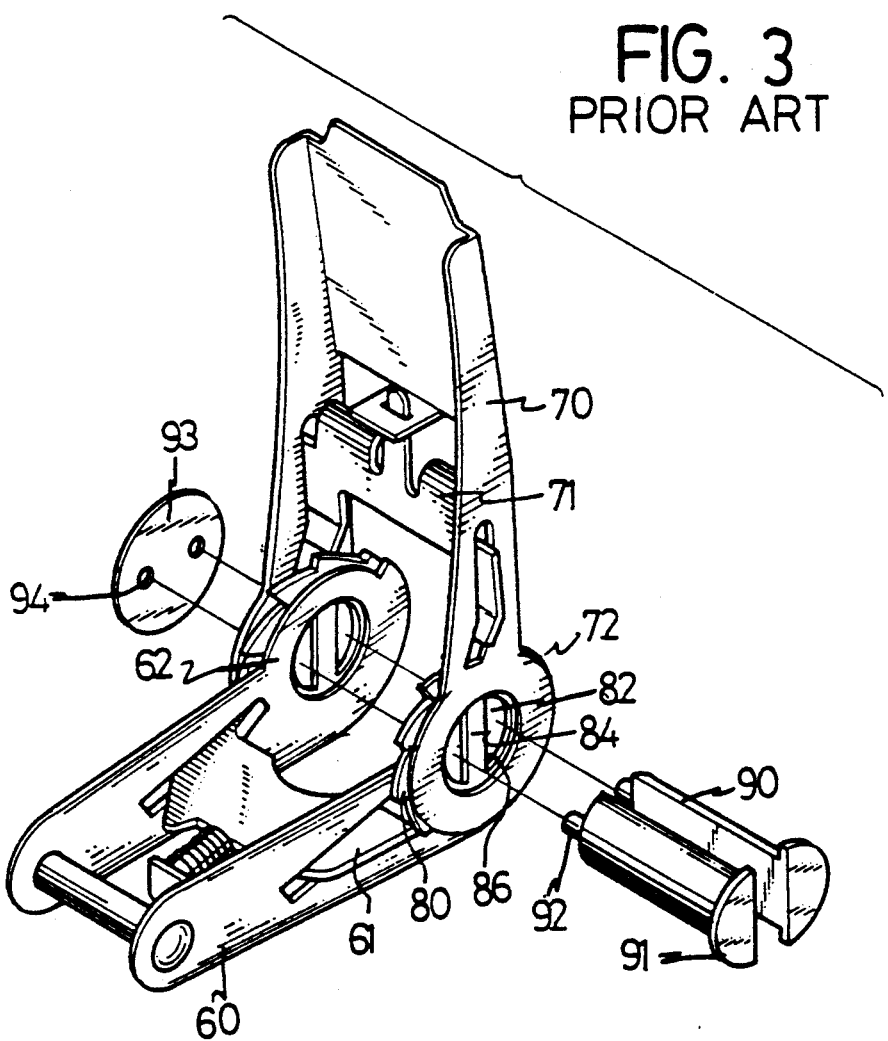
FIG. 3 is a partial exploded view of a typical strapping mechanism.

Referring next to FIG. 2, and again to FIG. 1, each of the shafts 40 includes a hollow interior and is formed from a plate 50 having the flange 41 formed on one end thereof and having the aperture 42 formed in the other end thereof, and includes two opposite edge portions 43 extended inwards of the shaft 40; such that the shafts 40 have higher strength and need not be formed by alloy materials. In addition, the shafts 40 are not made of molding processes such that no molds are required, the molds generally cost a lot of money.

Accordingly, the strapping mechanism in accordance with the present invention includes a pair of shafts whose strength has been greatly increased and whose manufacturing cost has been greatly lowered.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A strapping mechanism comprising a base having a stop disposed therein and having a pair of lugs oppositely provided therein, a handle having a pawl disposed therein and having a pair of ears oppositely provided therein and aligned with said lugs of said base respectively, a ratchet wheel disposed between each of said lugs and a respective ear and engageable with said stop and said pawl, each of said ratchet wheels including a hole formed in a center thereof, a rib formed in said hole so as to separate said hole into a pair of opposite semi-circular openings, and a pair of shafts engaged through said openings so as to form a rotating axle of said base and said handle, said ratchet wheel rotating in concert with said shafts, each of said shafts including a flange formed on a first end thereof for engagement with one of said ears of said handle and an aperture formed in a second end thereof, a disc including two orifices formed therein for engagement with said second ends of said shafts, and a pin element engaged through said apertures of said shafts for retaining said disc in place, each of said shafts including a hollow interior and including two edge portions formed integrally with said shafts and extended inward of said shafts so as to increase strength of said shafts.

* * * * *